United States Patent
Dozen et al.

(10) Patent No.: US 9,936,095 B2
(45) Date of Patent: Apr. 3, 2018

(54) IMAGE FORMING APPARATUS AND NON-TRANSITORY COMPUTER READABLE RECORDING MEDIUM STORING IMAGE FORMING PROGRAM

(71) Applicant: KYOCERA Document Solutions Inc., Osaka (JP)

(72) Inventors: Kazuki Dozen, Osaka (JP); Yosuke Nakazato, Osaka (JP); Ryusuke Nakatani, Osaka (JP); Takashi Murakami, Osaka (JP); Makoto Kowaka, Osaka (JP)

(73) Assignee: KYOCERA Documents Solutions Inc., Osaka (JP)

( * ) Notice: Subject to any disclaimer, the term of this patent is extended or adjusted under 35 U.S.C. 154(b) by 0 days.

(21) Appl. No.: 15/158,123

(22) Filed: May 18, 2016

(65) Prior Publication Data

US 2016/0352958 A1    Dec. 1, 2016

(30) Foreign Application Priority Data

May 29, 2015    (JP) .................. 2015-109646

(51) Int. Cl.
*H04N 1/21*    (2006.01)
*H04N 1/44*    (2006.01)
(Continued)

(52) U.S. Cl.
CPC .............. *H04N 1/21* (2013.01); *G06F 3/122* (2013.01); *G06F 3/1238* (2013.01);
(Continued)

(58) Field of Classification Search
CPC .... H04N 1/21; H04N 1/00037; H04N 1/4413; H04N 2201/0094; G06F 3/1205; G06F 3/1238; G06F 3/1258; G06F 3/1274
See application file for complete search history.

(56) References Cited

U.S. PATENT DOCUMENTS

| | | | | |
|---|---|---|---|---|
| 5,625,860 A | * | 4/1997 | Maeda | G03G 15/5012 271/288 |
| 2006/0017951 A1 | * | 1/2006 | Tanaka | G06F 3/1222 358/1.13 |

(Continued)

FOREIGN PATENT DOCUMENTS

| | | |
|---|---|---|
| JP | H 11-348371 A | 12/1999 |
| JP | 2000-108425 A | 4/2000 |

(Continued)

*Primary Examiner* — Iriana Cruz
(74) *Attorney, Agent, or Firm* — Stein IP, LLC

(57) ABSTRACT

Provided is an image forming apparatus enabling more appropriate data deletion. The image forming apparatus includes an output setting circuit for performing output setting for adjusting an output of image data to a target output result by selection operation, an output operation circuit for performing output of image data by instruction operation so that a process corresponding to the output setting is performed, an association circuit for storing association information in which the output image data is associated with the output setting, a state determination circuit for determining whether or not the target output result can be obtained based on a current state of the apparatus, and a data deletion circuit for automatically deleting or selecting the deletion of the image data associated with the output setting based on the association information when it is determined that the target output result cannot be obtained.

15 Claims, 7 Drawing Sheets

(51) Int. Cl.
  *H04N 1/00* (2006.01)
  *G06F 3/12* (2006.01)
(52) U.S. Cl.
  CPC .......... *G06F 3/1267* (2013.01); *G06F 3/1274* (2013.01); *G06F 3/1285* (2013.01); *H04N 1/00037* (2013.01); *H04N 1/4413* (2013.01); *H04N 2201/0094* (2013.01)

(56) References Cited

U.S. PATENT DOCUMENTS

| | | | | |
|---|---|---|---|---|
| 2009/0323112 | A1* | 12/2009 | Kamei | G03G 15/5016 358/1.15 |
| 2011/0170893 | A1 | 7/2011 | Nishikawa | 399/81 |
| 2012/0229853 | A1 | 9/2012 | Okada | 358/1.15 |
| 2013/0128309 | A1 | 5/2013 | Higashiura | 358/1.15 |
| 2015/0220817 | A1* | 8/2015 | Kujirai | G06K 15/021 358/1.15 |
| 2017/0235529 | A1* | 8/2017 | Takenaka | G06F 3/1238 358/1.15 |

FOREIGN PATENT DOCUMENTS

| | | |
|---|---|---|
| JP | 2011-140200 A | 7/2011 |
| JP | 2012-190111 A | 10/2012 |
| JP | 2013-109510 A | 6/2013 |

* cited by examiner

US 9,936,095 B2

IMAGE FORMING APPARATUS AND NON-TRANSITORY COMPUTER READABLE RECORDING MEDIUM STORING IMAGE FORMING PROGRAM

INCORPORATION BY REFERENCE

This application is based upon and claims the benefit of priority from the corresponding Japanese Patent Application No. 2015-109646 filed May 29, 2015, the entire contents of which are hereby incorporated by reference.

BACKGROUND

The present disclosure relates to an image forming apparatus such as a multifunction peripheral that forms an image on a paper sheet, and particularly to an image forming apparatus that appropriately deletes image data and a non-transitory computer readable recording medium storing an image forming program.

There is an image forming apparatus including a typical image storage device that performs an automatic deletion process in which image data is automatically deleted from an HD when a predetermined period of time elapses after the image data is stored in a personal box, so that a user can use the personal box without being confused.

For this purpose, the HD of a typical image forming apparatus has a personal box region consisting of a plurality of storage regions, and a main control unit controls to delay the automatic deletion process of the image data responding to an operation performed to the image forming apparatus in a predetermined period of time.

Accordingly, because it is controlled to delay the automatic deletion process of the image data in response to an operation performed by operating means to the image storage device in a predetermined period of time, the user can use the storage regions without being confused.

However, in this apparatus, unless the image data is explicitly deleted in a predetermined period of time, the image data is kept continuously so that shortage of capacity of the HD may be caused.

SUMMARY

An image forming apparatus according to an aspect of the present disclosure includes an output setting circuit, an output operation circuit, an association circuit, a state determination circuit, and a data deletion circuit. The output setting circuit performs output setting for adjusting an output of image data to a target output result by a selection operation so as to enable more appropriate data deletion. The output operation circuit performs output of the image data by an instruction operation so that a process corresponding to the output setting is performed. The association circuit stores association information in which the output image data and the output setting are associated with each other. The state determination circuit determines whether or not the target output result can be obtained. When it is determined that the target output result cannot be obtained, the data deletion circuit automatically deletes the image data associated with the output setting or selects the deletion based on the association information.

A non-transitory computer readable recording medium according to another aspect of the present disclosure stores an image forming program that can be executed by a computer. The image forming program causes the computer to execute an output setting process carrying an output setting function for adjusting an output of image data to a target output result, an output process for outputting the image data so that a process corresponding to the output setting function is performed, an association process for storing association information in which the output image data and the output setting function are associated with each other, a state determination process for determining whether or not the target output result can be obtained based on a current state of the apparatus, and a data deletion process for automatically or selectively deleting the image data associated with the output setting based on the association information when it is determined that the target output result cannot be obtained.

DETAILED DESCRIPTION

The object of enabling more appropriate data deletion is realized by providing a data deletion unit that automatically deletes or selects deletion of image data associated with output setting based on association information when it is determined that a target output result cannot be obtained.

Example 1

[Image Forming Apparatus]

Figure 1:
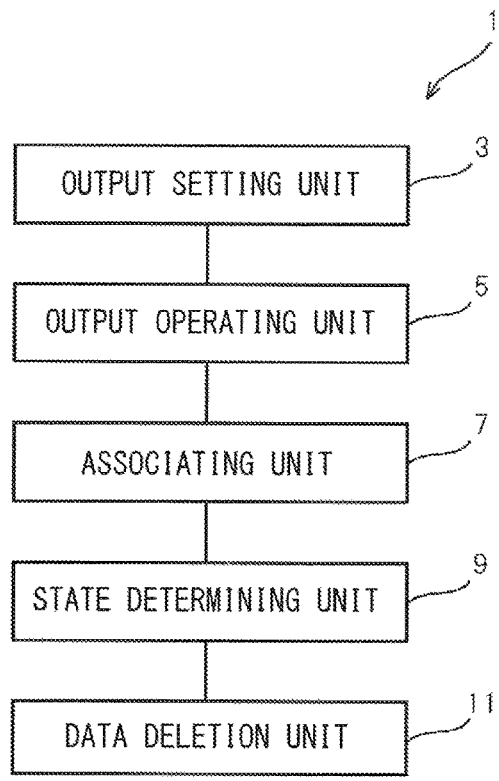
FIG. 1 illustrates a main structure of an image forming apparatus (Example 1).
Figure 2:
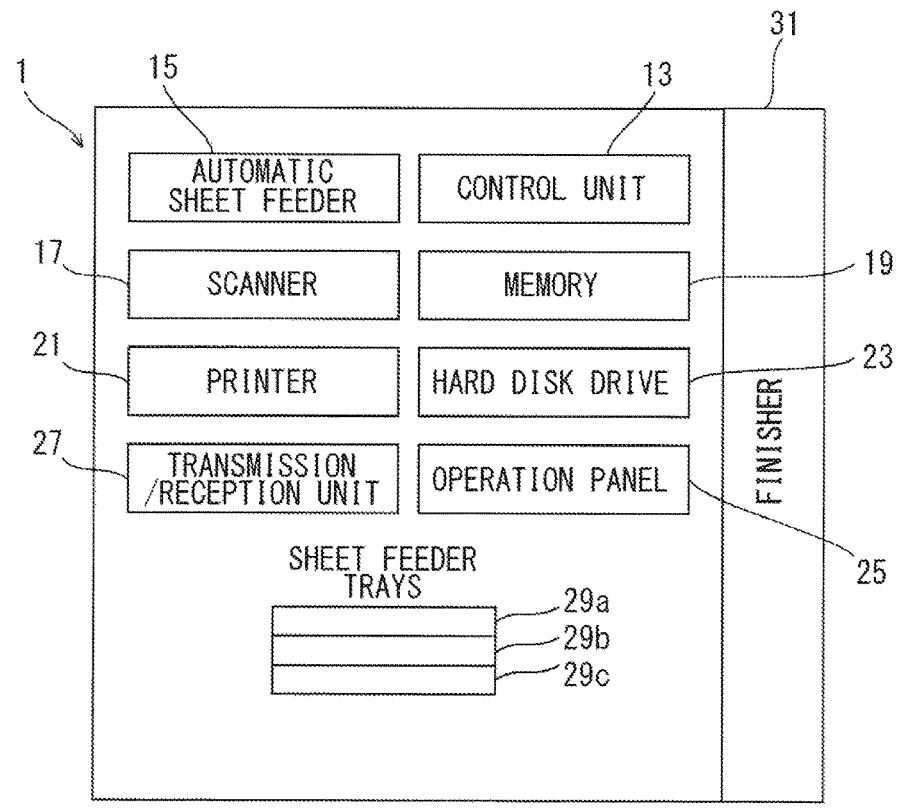
FIG. 2 illustrates an overall structure of the image forming apparatus (Example 1).

FIG. 1 illustrates a main structure of an image forming apparatus, and FIG. 2 illustrates an overall structure of the image forming apparatus.

As illustrated in FIG. 1, the image forming apparatus 1 includes an output setting unit 3, an output operating unit 5, an associating unit 7, a state determining unit 9, and a data deletion unit 11. The output setting unit 3, the output operating unit 5, the associating unit 7, the state determining unit 9, and the data deletion unit 11 have a processor such as a central processing unit (CPU) including one or more circuits. Here, the circuit can be an electronic component or an electronic substrate, in which a plurality of electronic elements are connected by wiring. The circuit can read and execute various programs, or can execute various programs incorporated therein in advance.

The output setting unit 3 performs output setting for adjusting an output of image data to a target output result by a selection operation, and is constituted of, for example, a touch panel type operation panel and a control unit of a multifunction peripheral described later, so that a selection is input by a touch operation.

The output operating unit 5 works for outputting the image data by an instruction operation and performing a process corresponding to the output setting, and is constituted of, for example, a start button and the control unit of the multifunction peripheral described later.

The associating unit 7 associates the output image data and the output setting with each other so as to store the same, and is constituted of, for example, the control unit and a memory of the multifunction peripheral described later. The control unit associates the output image data and the output setting with each other, and controls the memory to store the association information.

The state determining unit 9 determines whether or not the target output result can be obtained based on a current state of the apparatus, and is constituted of, for example, the control unit of the multifunction peripheral described later. The current state of the apparatus is a state whether or not the paper type is changed (a current configuration of the apparatus), a state whether or not a finisher is attached (a current configuration of the apparatus), or the like.

Whether or not the paper type is changed can be known by obtaining paper type change information of a sheet feeder tray. Whether or not a finisher is attached can be known by a signal of a switch for detecting whether the finisher is attached to or detached from the image forming apparatus.

The data deletion unit 11 automatically deletes or selects deletion of the image data associated with the output setting based on the association information when it is determined that the target output result cannot be obtained, and is constituted of, for example, the control unit and the operation panel of the multifunction peripheral described later. The selection of deletion is performed by the operation panel.

As illustrated in FIG. 2, the image forming apparatus 1 is constituted of a multifunction peripheral, for example, and includes a control unit 13 having a structure in which a memory is integrated to a processor. This processor is further equipped with, via interfaces, an automatic sheet feeder 15, a scanner 17, a memory 19, a printer 21, a hard disk drive 23, an operation panel 25, a transmission/reception unit 27, and sheet feeder trays 29*a*, 29*b*, and 29*c*. In addition, a finisher 31 is attached to the image forming apparatus 1 in an attachable and detachable manner.

The control unit 13 controls the individual units and the individual processes, and functions as the output setting unit 3, the output operating unit 5, the associating unit 7, the state determining unit 9, and the data deletion unit 11.

The automatic sheet feeder 15 performs document feeding for reading the document. An image of the document fed by the automatic sheet feeder 15 is read by the scanner 17, is stored in the memory 19, and is processed.

The memory 19 also stores the association information made by the control unit 13.

The printer 21 includes a paper sheet feeder, an image forming unit, a fixing device, and a paper sheet conveying unit. The image forming unit forms a toner image on a photosensitive drum based on the image data processed by the control unit 13, and transfers the toner image onto a paper sheet fed from the paper sheet feeder, e.g., one of the sheet feeder trays 29*a*, 29*b* and 29*c*. The fixing device fixes the toner image to the paper sheet. The paper sheet conveying unit conveys the paper sheet from the sheet feeder trays 29*a*, 29*b* and 29*c* to the image forming unit, and then conveys the paper sheet to the fixing device, and further discharges the paper sheet.

The sheet feeder trays 29*a*, 29*b* and 29*c* store various types of the paper sheets. As the types of the paper sheets, there are thick paper sheets and normal paper sheets, for example. Based on the output setting of paper type made by the user, the sheet feeder tray 29*a*, 29*b* or 29*c* selectively conveys the paper sheet. The output setting of paper type is made by designating of the sheet feeder tray 29*a*, 29*b* or 29*c*.

When the paper type is changed in the sheet feeder tray 29*a*, 29*b* or 29*c*, a signal of a paper type detection sensor or the like is sent to the control unit 13, and change information is stored in the memory 19.

A hard disk of the hard disk drive 23 stores an OS, an application program and data.

The operation panel 25 is a touch panel, for example, and is used by a user for various settings while displaying information. The operation panel 25 functions as the output setting unit 3 and the output operating unit 5.

The transmission/reception unit 27 is connected to an external computer via a network interface and a LAN so that a print job is executed, for performing transmission and reception of image information and the like.

The finisher 31 performs, for example, a staple process, a punch process, a paper folding process, or the like on the paper sheet on which the image is printed. The finisher 31 is attachable to and detachable from the image forming apparatus 1, and an attached/detached state (a current configuration of the apparatus) thereof is detected by a switch. The detection signal of the attached/detached state (a current configuration of the apparatus) of the finisher 31 is stored as the attach/detach information in the memory 19.

[Image Data Deletion Process]

Figure 3:
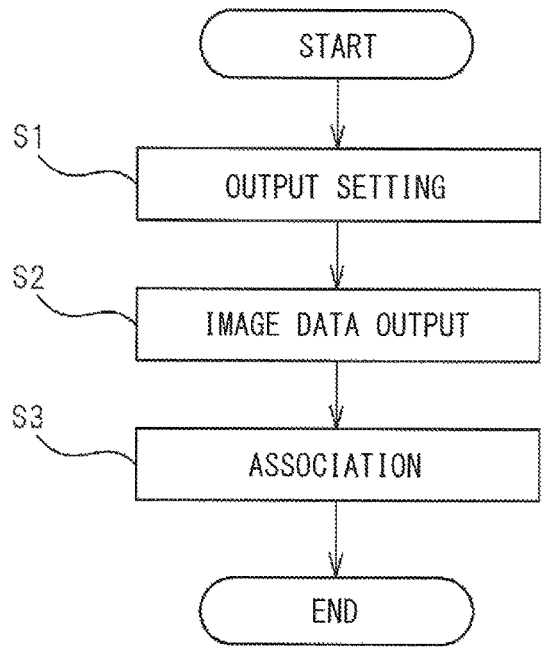
FIG. 3 illustrates steps of image data association (Example 1).

FIG. 3 illustrates steps of image data association.

As to Step S1 (hereinafter Step S is abbreviated as "S"), in a process of "output setting", the operation panel 25 displays a screen for output setting. By selection operation in this screen, the output setting is performed for adjusting the output of image data to a target output result.

For instance, it is supposed that thick paper sheets are set in the sheet feeder tray 29*a* among the sheet feeder trays 29*a*, 29*b* and 29*c*, and normal paper sheets are set in the sheet feeder trays 29*b* and 29*c*. If the output of image data is an output of an envelope, a postcard, or other thick paper sheet as a target output result, the sheet feeder tray 29*a* storing the corresponding thick paper sheet is selected.

In addition, when the staple process, the punch process, the paper folding process, or the like is performed in the state where the finisher 31 is attached, use of the finisher 31 is set.

These output settings are stored in the memory 19.

As to S2, in a process of "image data output", the control unit 13 reads image data from the hard disk of the hard disk drive 23 based on an operation of the start button, the printer 21 performs printing and outputting, so that a target print output using the thick paper sheet or an output using the finisher 31 can be performed.

As to S3, in a process of "association", the image data output by control by the control unit 13 and the output setting are associated with each other, and association information is stored in the memory 19. For instance, if the image data is being printed and output using the thick paper sheet, the image data and the sheet feeder tray 29*a* are associated with each other. If the image data is being printed and output by using the finisher 31, the image data and an attached state (presence) of the finisher 31 are associated with each other.

Figure 4:
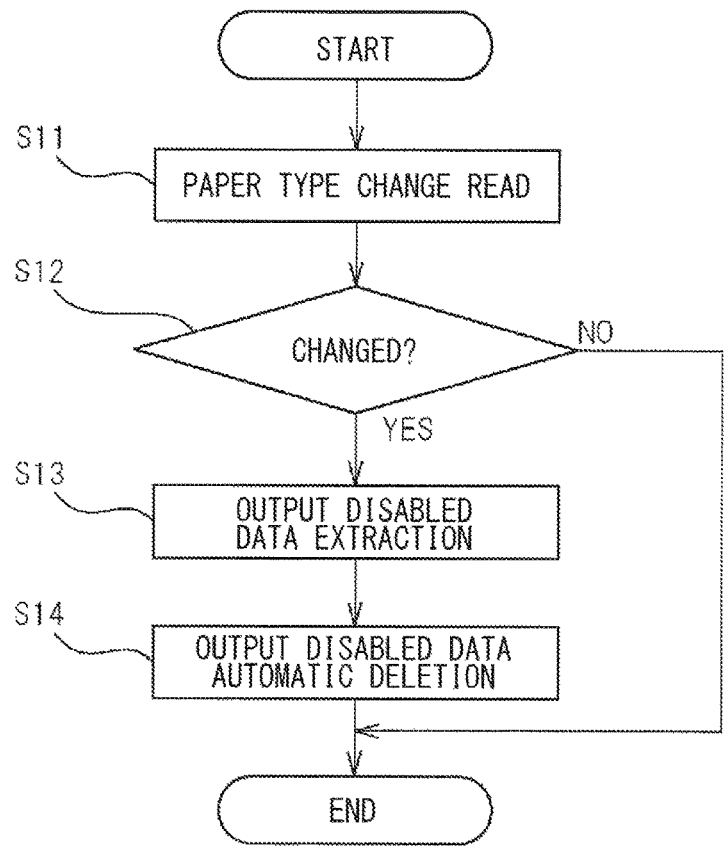
FIG. 4 illustrates steps of automatic image data deletion due to paper type change (Example 1).

FIG. 4 illustrates steps of automatic image data deletion due to paper type change.

As to S11, in a process of "paper type change read", the change information is read from the memory 19, and the process proceeds to S12.

As to S12, in a process of determination of "changed?", it is determined whether or not the paper type is changed based on the read change information. For instance, if the paper type of the sheet feeder tray 29*a* is changed from the thick paper sheet to the normal paper sheet (YES), the process proceeds to S3. If it is not changed (NO), the process is finished.

As to S13, in a process of "output disabled data extraction", the control unit 13 refers to the association information in the memory 19 so as to list image data associated with the sheet feeder tray 29*a* of the thick paper sheet, and the process proceeds to S14.

As to S14, in a process of "output disabled data automatic deletion", the listed image data are automatically deleted, and the process is finished.

Figure 5:
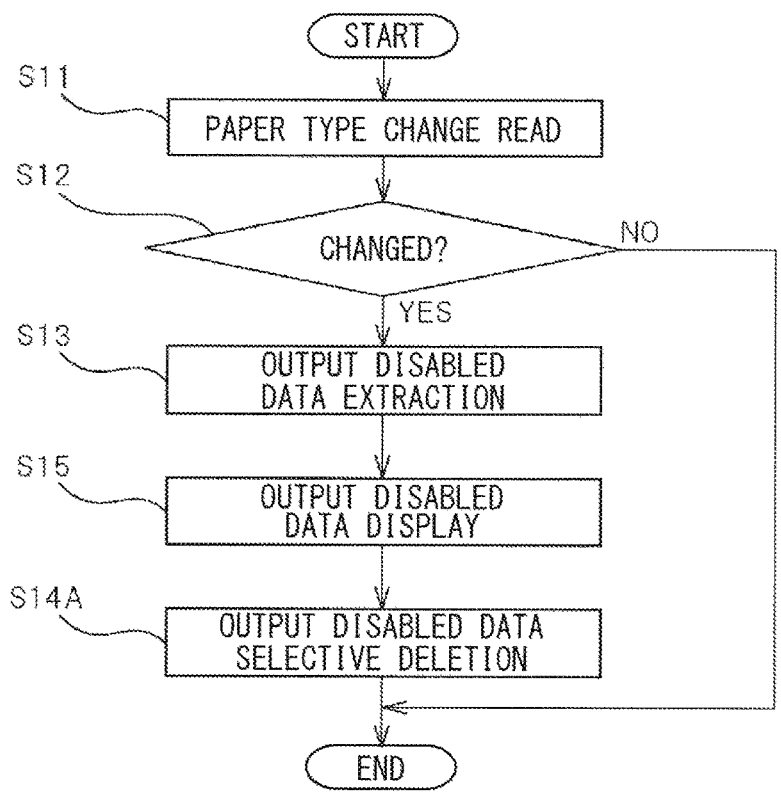
FIG. 5 illustrates steps of selective image data deletion due to the paper type change (Example 1).

FIG. 5 illustrates steps of selective image data deletion due to the paper type change. The flowchart of FIG. 5 is basically the same as the flowchart of FIG. 4, and the same step is denoted by the same numeral, while a corresponding step is denoted by the same numeral plus suffix A, so that overlapping description is omitted.

The flowchart of FIG. 5 includes steps S15 and S14A instead of the step S14 in the flowchart of FIG. 4.

As to S15, in a process of "output disabled data display", the image data listed in S13 is displayed on the operation panel 25, and the process proceeds to S14A. The image data may be displayed on a client PC connected to a network. Accordingly, when it is determined that a target output result cannot be obtained, the control unit 13 and the operation panel 25 constitute a data list display unit for extracting and displaying the image data associated with the output setting.

As to S14A in a process of "output disabled data selective deletion", the user checks a list of image data displayed on the operation panel 25 or the like, corresponding image data is selected by determination by the user, the selected image data is deleted from the hard disk by the control unit 13, and the process is finished.

Accordingly, the control unit 13 and the operation panel 25 constitute a selection unit for selectively deleting the displayed image data.

Figure 6:
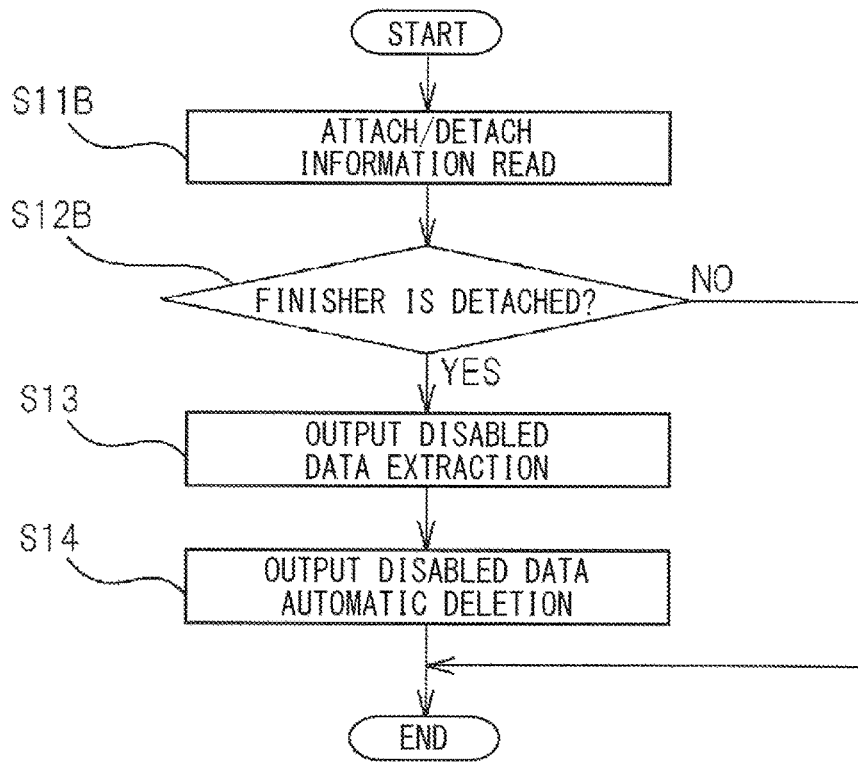
FIG. 6 illustrates steps of the automatic image data deletion due to presence or absence of a finisher (Example 1).

FIG. 6 illustrates steps of the automatic image data deletion due to presence or absence of the finisher. The flowchart of FIG. 6 is basically the same as the flowchart of FIG. 4, and the same step is denoted by the same numeral, while a corresponding step is denoted by the same numeral plus suffix B, so that overlapping description is omitted.

The flowchart of FIG. 6 includes steps S11B and S12B instead of the steps S11 and S12 in the flowchart of FIG. 4.

As to S11B, in a process of "attach/detach information read", the attach/detach information indicating whether the finisher 31 is attached or detached is read, and the process proceeds to S12B.

As to S12B, in a process of determination of "finisher is detached?", presence or absence of the finisher 31 is determined based on the read information. If there is the finisher 31 (YES), the process proceeds to S13. If there is not the finisher 31 (NO), the process is finished.

The steps S13 and S14 are processed in the same manner as in FIG. 4, and the listed image data are automatically deleted.

Figure 7:
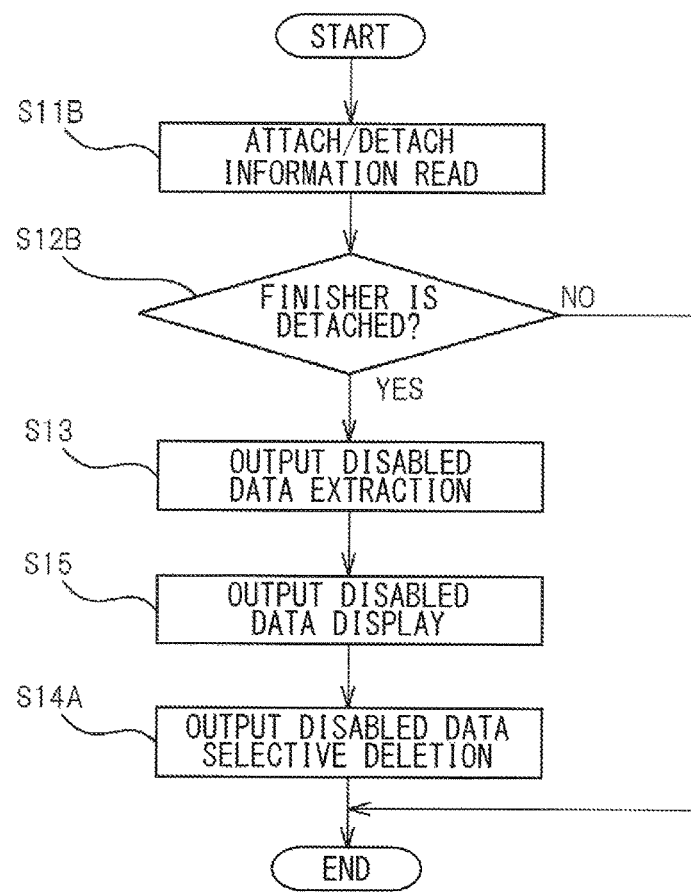
FIG. 7 illustrates steps of the selective image data deletion due to presence or absence of the finisher (Example 2).

FIG. 7 illustrates steps of the selective image data deletion due to presence or absence of the finisher. The flowchart of FIG. 7 is basically the same as the flowchart of FIG. 6 and corresponds to the flowchart of FIG. 5. Accordingly, the same step as in FIG. 5 and FIG. 6 is denoted by the same numeral, so that overlapping description is omitted.

The flowchart of FIG. 7 includes the steps S15 and S14A in the flowchart of FIG. 5 instead of the step S14 in the flowchart of FIG. 6.

The steps S11B and S12B are processed in the same manner as in FIG. 6. Concerning presence or absence of the finisher 31, as to S15, in the process of "output disabled data display", the listed image data are displayed on the operation panel 25 in the same manner as in FIG. 5.

As to S14A, in the process of "output disabled data selective deletion", the user checks the list of the image data displayed on the operation panel 25 or the like in the same manner as in FIG. 5, the image data is selectively deleted by determination by the user, and the process is finished.

[Effect of Example 1]

In Example 1, when it is determined that the output result using the thick paper sheet or the finisher cannot be obtained, the image data associated with the output setting of the thick paper sheet or use of the finisher can be automatically deleted or the deletion can be selected.

Accordingly, appropriate data deletion can be performed, so that shortage of storage capacity of the hard disk can be prevented.

Example 2

Figure 8:
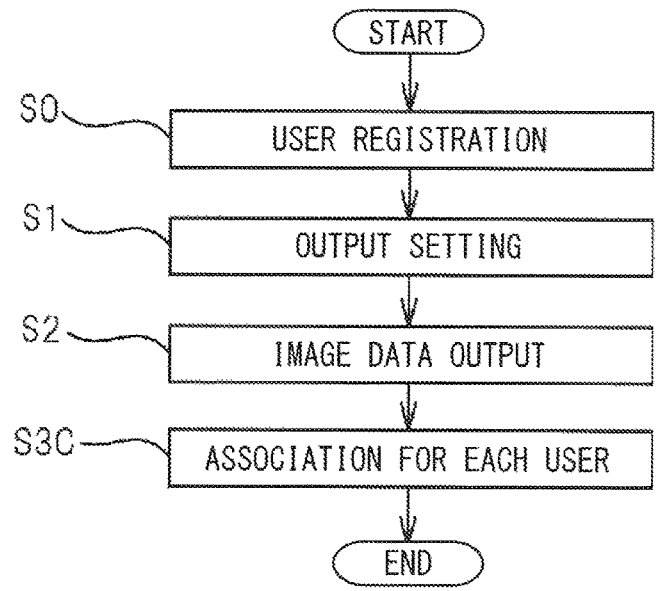
FIG. 8 illustrates steps of the data association (Example 2).

FIG. 8 illustrates steps of the data association. The flowchart of FIG. 8 is basically the same as the flowchart of FIG. 3, and the same step is denoted by the same numeral, while a corresponding step is denoted by the same numeral plus suffix C, so that overlapping description is omitted.

The flowchart of FIG. 8 includes a step S3C instead of the step S3, and includes a step S0 before the step S1 in the flowchart of FIG. 3.

In Example 2, associations can be made respectively for individual users based on user registration.

As illustrated in FIG. 8, in a process of "user registration" in S0, a user registration screen is displayed on the operation panel 25, so that an ID and a password are input. When the ID and the password are input so that the user registration is completed by a process in the control unit 13, the user registration is stored in the memory 19 of the hard disk drive 23, and the process proceeds to S1. Accordingly, in Example 2, the operation panel 25, the control unit 13, and the memory 19 constitute a user registration unit that performs the user registration.

The steps S1 and S2 are processed in the same manner as in FIG. 3, and a process of "association for each user" is performed in S3C. In this process, the image data is associated with the sheet feeder tray 29*a* of the thick paper sheet or the attachment (presence) of the finisher 31 in the same manner as in S3, and this association is performed for every user, so that the association information for each user is recorded in the memory 19.

Figure 9:
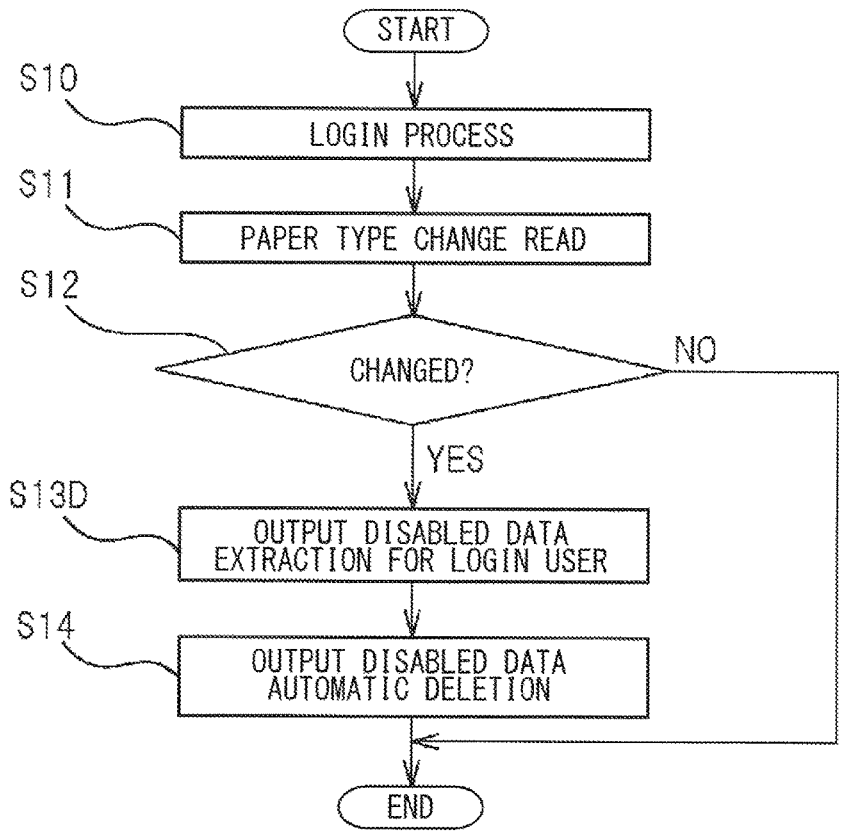
FIG. 9 illustrates steps of the automatic image data deletion due to the paper type change (Example 2).

FIG. 9 illustrates steps of the automatic image data deletion due to the paper type change. The flowchart of FIG. 9 is basically the same as the flowchart of FIG. 4, the same step as in FIG. 4 is denoted by the same numeral, while a corresponding step is denoted by the same numeral plus suffix D, so that overlapping description is omitted.

The flowchart of FIG. 9 includes a step S13D instead of the step S13 in the flowchart of FIG. 4, and a step S10 before the step S11.

As to S10, in a process of "login process", when the user input an ID and a password on a screen displayed on the operation panel 25, the control unit 25 performs a user approval process based on registration information recorded in the memory 19. When the user is approved, the process proceeds to S11.

The steps S11 and S12 are processed in the same manner as in FIG. 4. In a process of "output disabled data extraction for login user" in S13D, the output disabled image data are listed for the login user based on the association information recorded in the memory 19, and the process proceeds to S14.

Figure 10:
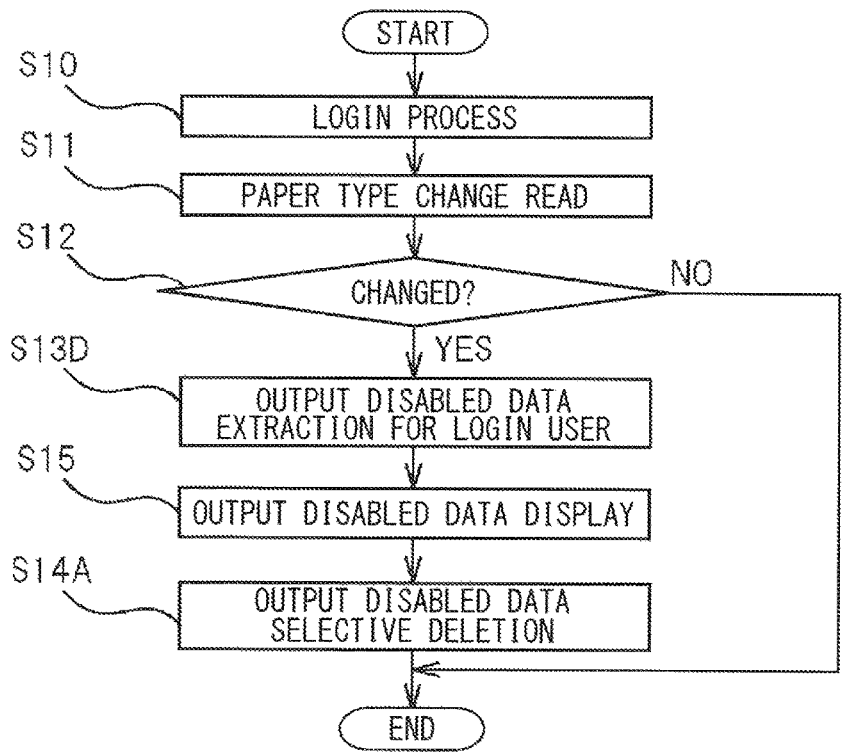
FIG. 10 illustrates steps of the selective image data deletion due to the paper type change (Example 2).

As to S14, the listed image data are automatically deleted in the same manner as in FIG. 4, and the process is finished. FIG. 10 illustrates steps of the selective image data deletion due to the paper type change. The flowchart of FIG. 10 is basically the same as the flowchart of FIG. 9 and corresponds to the flowchart of FIG. 5. Accordingly, the same step as in FIGS. 5 and 9 is denoted by the same numeral, so that overlapping description is omitted.

The flowchart of FIG. 10 includes the steps S15 and S14A in the flowchart of FIG. 5 instead of the step S14 in the flowchart of FIG. 9.

The steps S10, S11, S12 and S13D are processed in the same manner as in FIG. 9. After the login process, concerning presence or absence of the finisher 31, as to S15, in the process of "output disabled data display", the listed image data are displayed on the operation panel 25 in the same manner as in FIG. 5.

As to S14A, in the process of "output disabled data selective deletion", the user checks the list of image data displayed on the operation panel 25 or the like in the same manner as in FIG. 5, the image data are selectively deleted by determination by the user, and the process is finished.

Figure 11:
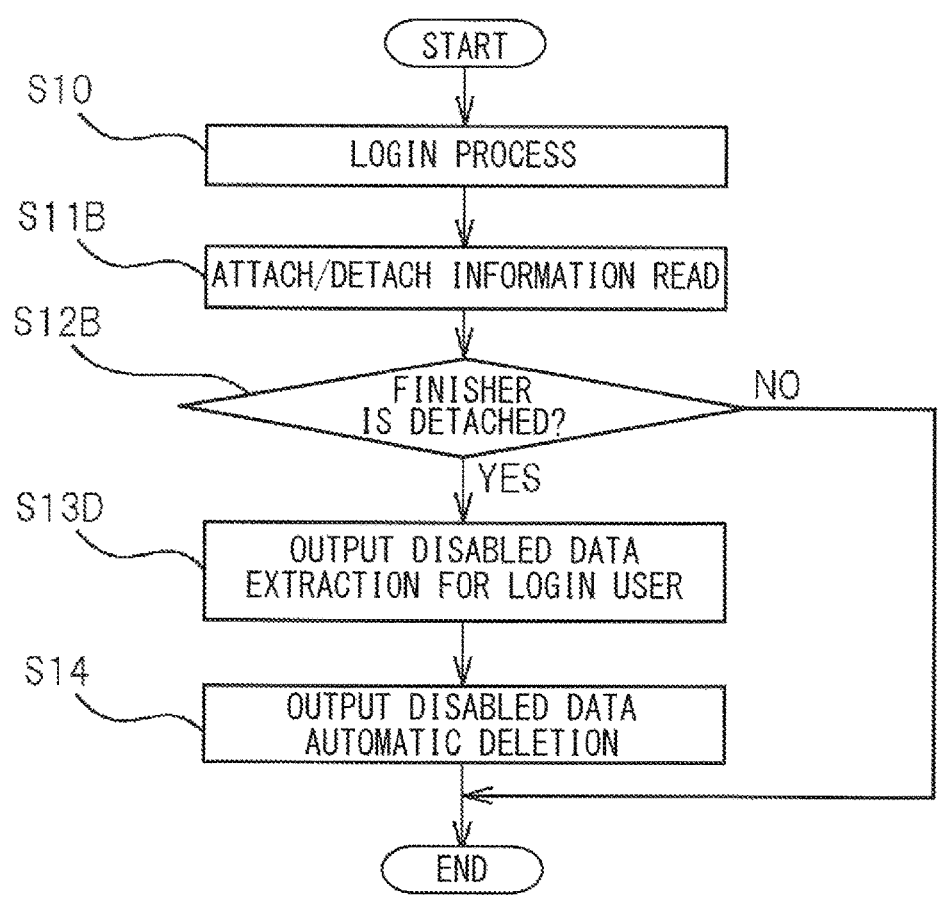
FIG. 11 illustrates steps of the automatic image data deletion due to presence or absence of the finisher (Example 2).

FIG. 11 illustrates steps of the automatic image data deletion due to presence or absence of the finisher. The flowchart of FIG. 11 is basically the same as the flowchart of FIG. 9 and corresponds to the flowchart of FIG. 6. Accordingly, the same step as in FIGS. 6 and 9 is denoted by the same numeral, so that overlapping description is omitted.

The flowchart of FIG. 11 includes the steps S11B and S12B in the flowchart of FIG. 6 instead of the steps S11 and S12 in the flowchart of FIG. 9.

Accordingly, after the login process, concerning presence or absence of the finisher 31, the listed image data are automatically deleted for the login user.

Figure 12:
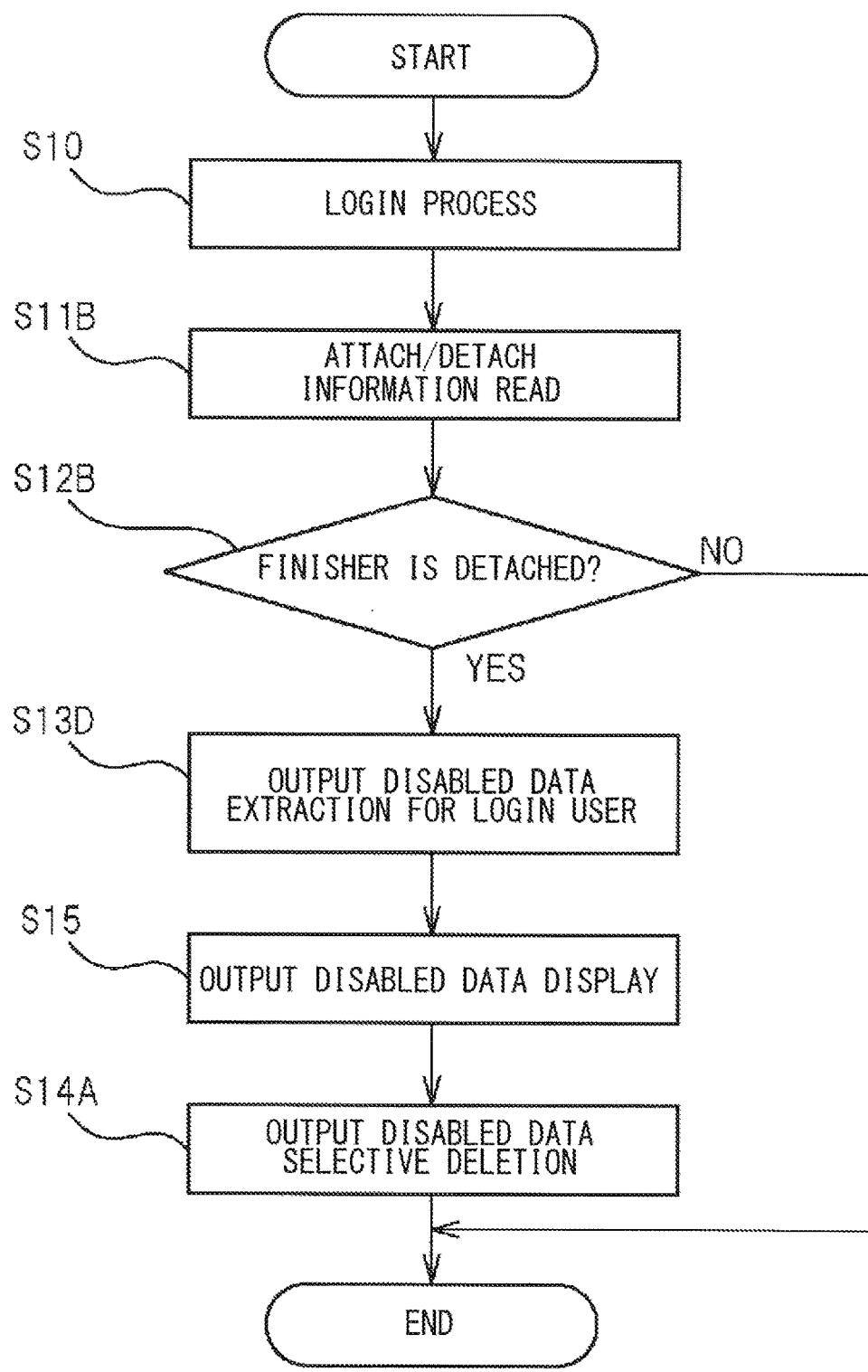
FIG. 12 illustrates steps of the selective image data deletion due to presence or absence of the finisher (Example 2).

FIG. 12 illustrates steps of the selective image data deletion due to presence or absence of the finisher. The flowchart of FIG. 12 is basically the same as the flowchart of FIG. 11 and corresponds to the flowchart of FIG. 5. Accordingly, the same step as in FIGS. 5 and 11 is denoted by the same numeral, so that overlapping description is omitted.

The flowchart of FIG. 12 includes the steps S15 and S14A in the flowchart of FIG. 5 instead of the step S14 in the flowchart of FIG. 11.

Accordingly, after the login process, concerning presence or absence of the finisher 31, the login user checks the list of image data displayed on the operation panel 25 or the like, the image data are selectively deleted by determination by the user, and the process is finished.

In addition, in Example 2, the memory 19 constitutes a storage unit for storing association information as a result of the determination by the control unit 13, and the login user can allow the operation panel 25 to display a change list of the paper type or the like as the determination result stored in the memory 19. In this case, the operation panel 25 constitutes a checking unit that enables to check the change list.

The login user checks the paper type or the like changed by another person and can allow the selective deletion of the image data in the list of image data listed and displayed on the operation panel 25 as described above, based on the change made by another person.

[Effect of Example 2]

In Example 2, the image data can be deleted for the user who did the login process based on the user registration.

As described in Example 1 and Example 2, according to the image forming apparatus and the non-transitory computer readable recording medium storing the image forming program of the present disclosure, when it is determined that the target output result cannot be obtained, the image data associated with the output setting can be automatically deleted or the deletion can be selected. Thus, appropriate data deletion can be performed, so that shortage of storage capacity of the hard disk can be prevented.

What is claimed is:

1. An image forming apparatus, comprising:
a memory that stores an image forming program;
a processor that executes the image forming program; and
a storage that stores image data,
wherein
when the processor executes the image forming program, the processor
performs output setting for adjusting an output of image data to a target output result by a selection operation,
performs output of the image data by an instruction operation so that a process corresponding to the output setting is performed,
stores association information in which the output image data and the output setting are associated with each other,
determines whether or not the target output result corresponding to the output setting can be obtained based on a current configuration of the apparatus, and
automatically deletes or selects the deletion of the image data associated with the output setting based on the association information when it is determined that the target output result cannot be obtained,
a finisher is attachable to the image forming apparatus,
the output setting is whether or not the finisher is used, and
the current configuration of the apparatus determined by the processor is whether or not the finisher is attached.

2. The image forming apparatus according to claim 1, wherein
the output setting further includes a paper type, and
the current configuration of the apparatus determined by the processor is a set state of the paper type or whether or not the finisher is used.

3. The image forming apparatus according to claim 1, wherein
when the processor executes the image forming program, the processor
performs user registration, performs a user login process,
stores the association information for each user who did the user registration, and
performs the image data deletion for the user who did the login process.

4. The image forming apparatus according to claim 3, wherein
when the processor executes the image forming program, the processor
stores a result of determination of the current configuration of the apparatus determined by the processor, and
enables the login user to check the stored result of determination.

5. The image forming apparatus according to claim 1, wherein
when the processor executes the image forming program, the processor
extracts and displays the image data associated with the output setting when it is determined that the target output result cannot be obtained, and
selectively deletes the displayed image data.

6. The image forming apparatus according to claim 1, wherein
the output setting further includes a paper type, the current configuration of the apparatus determined by the processor is a set state of the paper type or whether or not the finisher is used, and
when the processor executes the image forming program, the processor
performs user registration,
performs a user login process,
stores the association information for each user who did the user registration,
performs the image data deletion for the user who did the login process,
stores a result of determination of the current configuration of the apparatus,
enables the login user to check the stored result of determination,
extracts and displays the image data associated with the output setting when it is determined that the target output result cannot be obtained, and
selectively deletes the displayed image data.

7. A non-transitory computer readable recording medium storing an image forming program executable by a computer of an image forming apparatus to which a finisher is attachable, the image forming program causing the computer to execute:
an output setting process carrying an output setting function for adjusting an output of image data to a target output result and including whether or not the finisher is used;
an output process for outputting the image data so that a process corresponding to the output setting function is performed;
an association process for storing association information in which the output image data and the output setting function are associated with each other;
a state determination process for determining whether or not the target output result corresponding to the output setting process can be obtained based on a current configuration of the apparatus including whether or not the finisher is attached; and
a data deletion process for automatically or selectively deleting the image data associated with the output setting based on the association information when it is determined that the target output result cannot be obtained.

8. The image forming apparatus of claim 1, further comprising:
a switch that detects whether the finisher is attached or detached to transmit a detection signal,
wherein
when the processor executes the image forming program, the processor
stores attach/detach information indicating whether the finisher is attached or detached in the memory based on the detection signal,
reads the attach/detach information from the memory to determine whether or not the finisher is attached, and
when the finisher is detached, automatically deletes or selects the deletion of the image data associated with the output setting of use of the finisher.

9. The image forming apparatus of claim 8, wherein
the output setting further includes a paper type,
the current configuration of the apparatus determined by the processor is a set state of the paper type or whether or not the finisher is used, and
when the processor executes the image forming program, the processor
performs user registration,
performs a user login process,
stores the association information for each user who did the user registration,
performs the image data deletion for the user who did the login process,
stores a result of determination of the current configuration of the apparatus,
enables the login user to check the stored result of determination,
extracts and displays the image data associated with the output setting when it is determined that the target output result cannot be obtained, and
selectively deletes the displayed image data.

10. The recording medium of claim 7, wherein the image forming program causes the computer to execute:
a process of storing attach/detach information indicating whether the finisher is attached or detached in the memory based on a detection signal from a switch that detects whether the finisher is attached or detached to transmit the detection signal,
a process of reading the attach/detach information from the memory to determine whether or not the finisher is attached, and
a process of, when the finisher is detached, automatically deleting or selecting the deletion of the image data associated with the output setting of use of the finisher.

11. The recording medium of claim 7, wherein
the output setting further includes a paper type, and
the current configuration of the apparatus is a set state of the paper type or whether or not the finisher is used.

12. The recording medium of claim 7, wherein
the image forming program
performs user registration,
performs a user login process,
stores the association information for each user who did the user registration, and
performs the image data deletion for the user who did the login process.

13. The recording medium of claim 12, wherein
the image forming program
stores the current configuration of the apparatus, and enables the login user to check the stored result of determination.

14. The recording medium of claim 7, wherein the image forming program
    extracts and displays the image data associated with the output setting when it is determined that the target output result cannot be obtained, and
    selectively deletes the displayed image data.

15. The recording medium of claim 7, wherein the output setting further includes a paper type, the current configuration of the apparatus is a set state of the paper type or whether or not the finisher is used, and the image forming program
    performs user registration,
    performs a user login process,
    stores the association information for each user who did the user registration,
    performs, for the user who did the login process, the image data deletion when it is determined that the target output result cannot be obtained,
    stores a result of the determination,
    enables the login user to check the stored result of determination,
    extracts and displays the image data associated with the output setting when it is determined that the target output result cannot be obtained, and
    selectively deletes the displayed image data.

* * * * *